United States Patent [19]
Radu

[11] 3,794,783
[45] Feb. 26, 1974

[54] TELEPHONE-SYSTEM MONITORING AND RECORDAL APPARATUS USING ORDINARY PAPER

[75] Inventor: Stan G. Radu, Bucharest, Rumania

[73] Assignee: Directia De Telecomunicatii a Municipiu Bucuresti, Bucharest, Rumania

[22] Filed: Nov. 5, 1971

[21] Appl. No.: 196,042

[52] U.S. Cl. .................... 179/175.2 C, 179/7.1 TP
[51] Int. Cl. .......................................... H04m 3/22
[58] Field of Search ................ 179/7.1 TP, 175.2 C

[56] References Cited

UNITED STATES PATENTS 2,981,806 4/1961 Middaugh .................. 179/175.2 C
2,272,475 2/1942 Ostline .......................... 179/7.1 TP

*Primary Examiner*—Kathleen H. Claffy
*Assistant Examiner*—Douglas W. Olms
*Attorney, Agent, or Firm*—Karl F. Ross, Herbert Dubno

[57] ABSTRACT

Telephone service equipment adapted to genuine conception, construction and way of working, since it can record graphically on a common paper sheet for the monitored telephone line the time of the connection, call number of the called subscriber in form of ciphers from 1 to 0 calling number and category of the line requiring the connection and, tariff rate charging impulses with the possibility of recording in a different color any false impulses or special observations.

6 Claims, 15 Drawing Figures

LINE SELECTION-AND-CONNECTION CIRCUIT

GROUP - CONNECTION CIRCUIT

SUBSCRIBER- CATEGORY MONITORING CIRCUIT

CALLED-LINE REGISTER

TELEPHONE-SYSTEM MONITORING AND RECORDAL APPARATUS USING ORDINARY PAPER

1. Field of the Invention

This invention relates to an observation apparatus for telephone lines with graphic recording on an ordinary paper sheet, which is generally necessary in an automatic exchange.

2. Background of the Invention

There are known "observation boards" or "recording apparatuses" various systems and installations for monitoring telephone lines, which operate by sight and wherein the recording of the data is done by hand by an operator for one or many lines.

The known recording apparatus for tape recording monitor only the following recording items:

the called subscriber's call number in ciphers from 1 to 0;

message rate impulses, as asterisks;

for off-peak night-rates the call numbers and signs are underlined;

date and hour are stated by continuous marking of the hour whether or not the line is engaged with the day be written by hand or by date-stamp on the tape when the apparatus is started, the pulses being given by an electric control clock;

the connection duration of an outgoing call, measured by recording periodic signs while the line is engaged, the time pulses being attained by means of a contact and of an electric rotative switch mounted upon a shaft rotating by one turn per minute, connected to a clock contained in the equipment;

1 is marked by an answering system.

The observing possibilities of these known installations satisfy only partially the needs and exigencies of modern service because of a series of drawbacks and lacking operations.

A. *The recording apparatus* can be utilized only on an individual line. They do the recording only upon a light-sensitive paper, and the time is given in hours, the number of pulses per time cannot be accurately controlled;

they do not record the time for each call, but only from hour to hour they do not discriminate between coupled subscribers and incomplete calls, they do not record on tape the calendar dates of a connection; (month, day, minute, second);

they do not reveal operating troubles, their nature, nor the stage at which they occur;

they do not follow the several stages of a call by a subscriber (picking up the receiver, dialling the number, response by the line called, end of call and replacing of the receiver).

they do not indicate tariff rates (unrelated to distance and time of call, or indicate no rates at all).

they do not indicate the attempts of the (subscriber to call, i.e. up and replacing the receiver without dialling);

they do not defect false starts, nor their duration;

they do not detect wrong charges which occur either by accident or intention of coupled subscribers.

they do not reveal nor record false pulses when the line is not in use and the receiver is on the hook.

they do not record the time nor the duration of the calls, nor false pulses during the call;

they do not signal — optically or acoustically the stage at which a malfunction occurs;

they do not reveal the faults in the exchange; and they do not analyze the nature of false pulses, but only record them.

B. *The observation boards* are affected by the same drawbacks as the recording apparatus and besides, by the following ones:

gathering and registering of the data must be done by the operator:

the boards cannot operate simultaneously upon several types of exchanges;

they cannot operate upon coupled lines and;

while working upon a line they do not give indications with respect to all other lines under observation.

SUMMARY OF THE INVENTION

The telephone service observation appliance with graphic recording on an ordinary paper sheet according to this invention eliminates the above mentioned drawbacks by printing on the sheet of paper the time of the connection in month, day, hour, minute, second, the dialed call number of the subscriber who is being called, in the form of ciphers from 1 to 0, the calling number of the line asking for the connection, the category of the line, charging pulses with automatic control of the rate, the indicia in different color of any false pulses or of a special observation, all in a small line of a paper sheet, while simultaneously monitoring other lines.

The device comprises line signaling, selection and connection circuits connected in groups of 10 each, which allow the selection of one line out of 10 lines under observation, a common connection circuit, a group connection circuit, a group selection and connection circuit allowing the selection of one group of 10 lines, and an automaton analysing the succession of operations for one connection. The automaton consists of a circuit recording the line call number, the duration of the connection, a charging circuit with control of the tariff to correspond, to the distance and duration of the conversation, a special observation circuit adjustable to the exchange type and means for printing on the paper sheet, the data gathered by the circuit as enumerated above, the circuits of the appliance being connected to one another, and connected in series or shunt to the telephone subscriber lines.

DESCRIPTION OF THE DRAWING

The telephone service observation appliance of the invention is described below with reference to the accompanying drawing in which.

SPECIFIC DESCRIPTION

The telephone service observation appliance consists of a primary connection circuit assembly $C_L$ formed for instance of 10 subscriber lines, connected, on one side, to the subscriber lines and on the other side to a secondary common connection circuit $C_{CC}$ which ensures the connection of the line groups $C_L$ to a group circuit $C_g$. This group circuit $C_g$ serves to connect each group of 10 lines $C_L$ individually to a robot automaton $R_g$.

Figure 2:
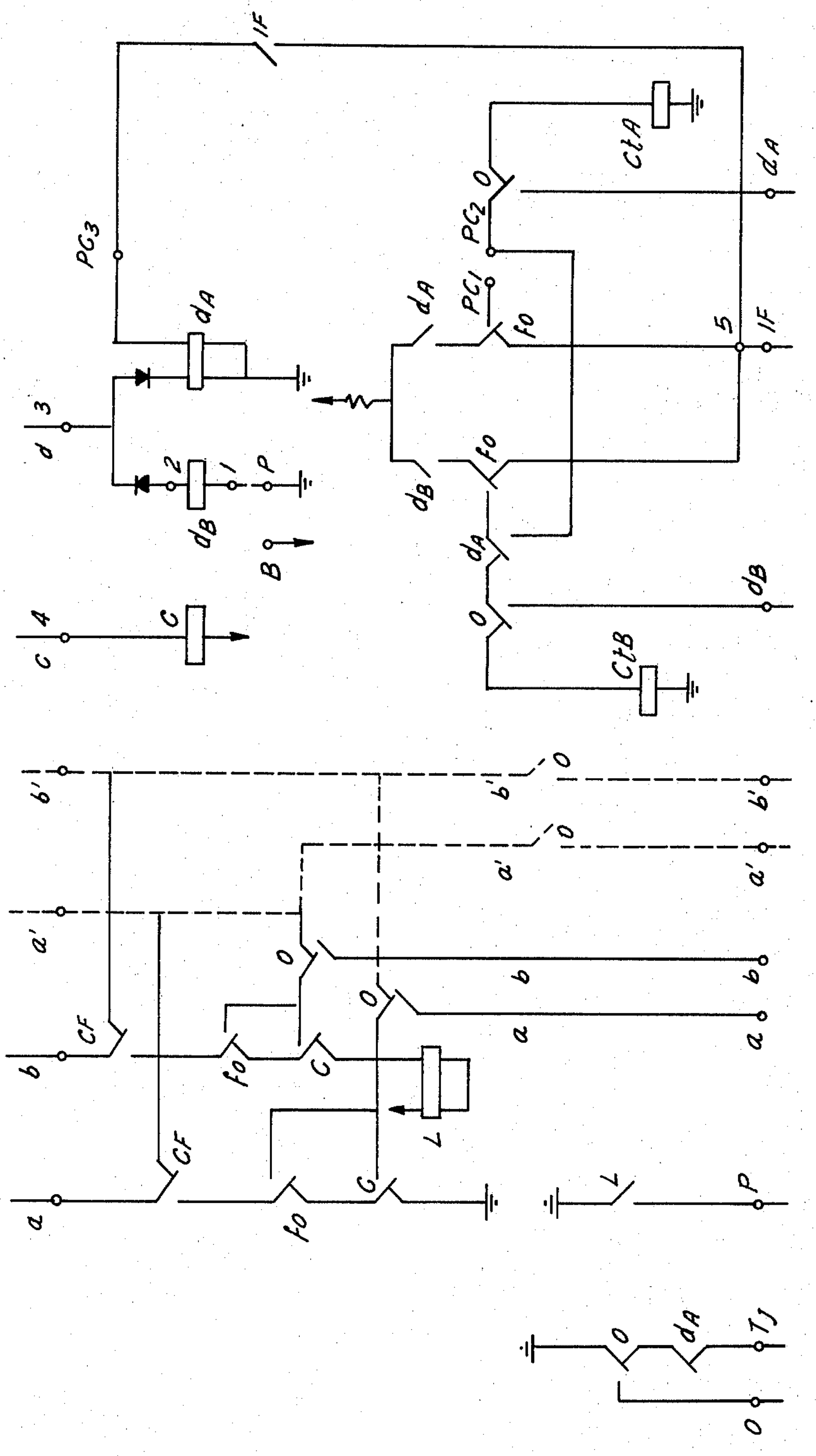
FIG. 2: Circuit diagram for analyzing and recording the calls not recorded by the automaton onto the paper sheet, and for recording reception of false impulses.

The primary circuits $C_{L\ 1\text{-}10}$, comprise an individual circuit for each line as represented in FIG. 2, which receives the line signal to starts the call, receives possible false pulses, either when the line is resting, or when it is called (both for subscriber A and for subscriber B) monitors the conversations of the subscriber A apart from those of subscriber B, and, when the robot is occupied. transmits to the common connection circuit $C_{CC}$ a "line in call" and engages the robot circuit after the group and line selection have been done and transmits then the datas concerning the observed line.

Figure 3:
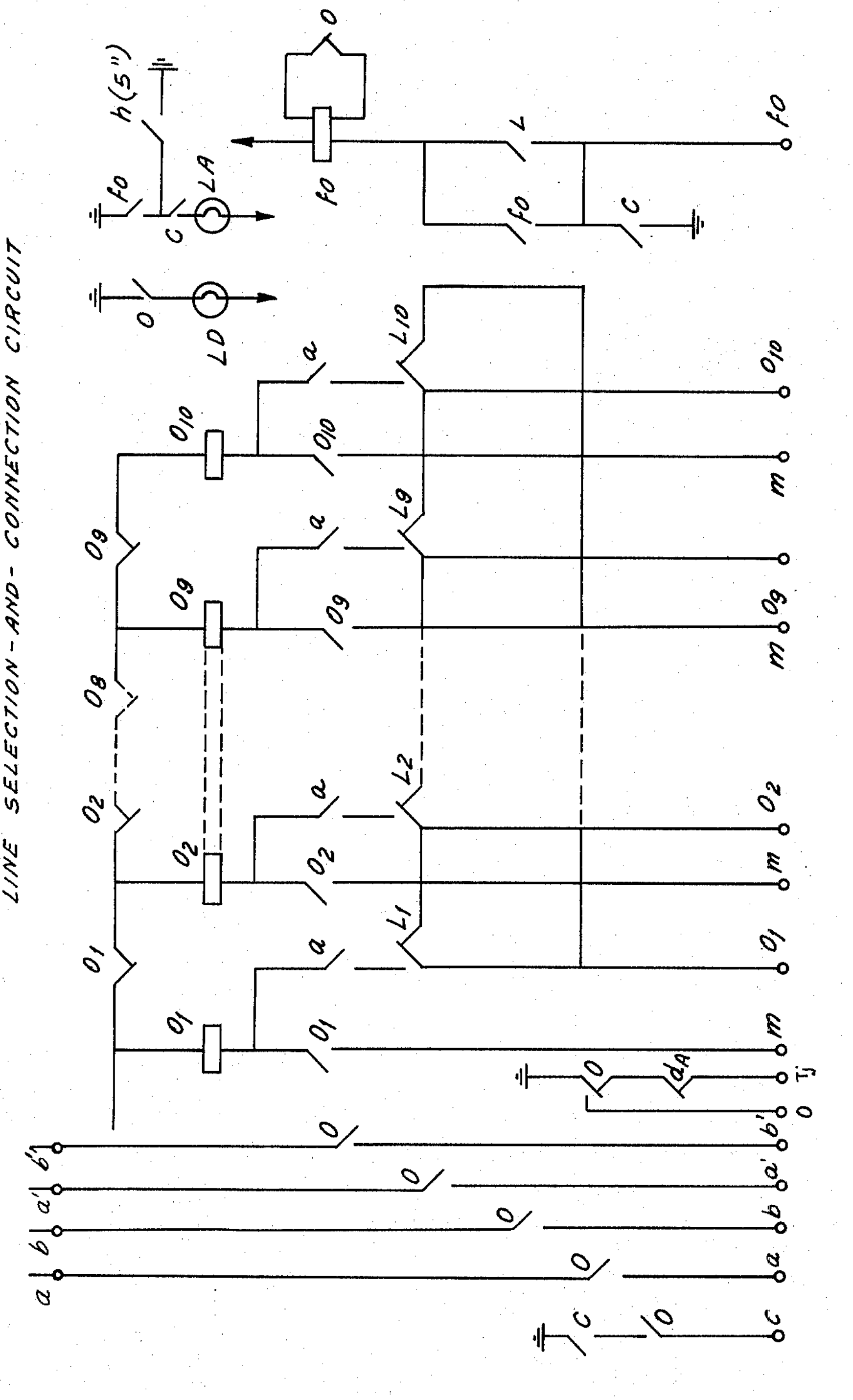
FIG. 3: Circuit diagram for line selection and connection.
Figure 4:
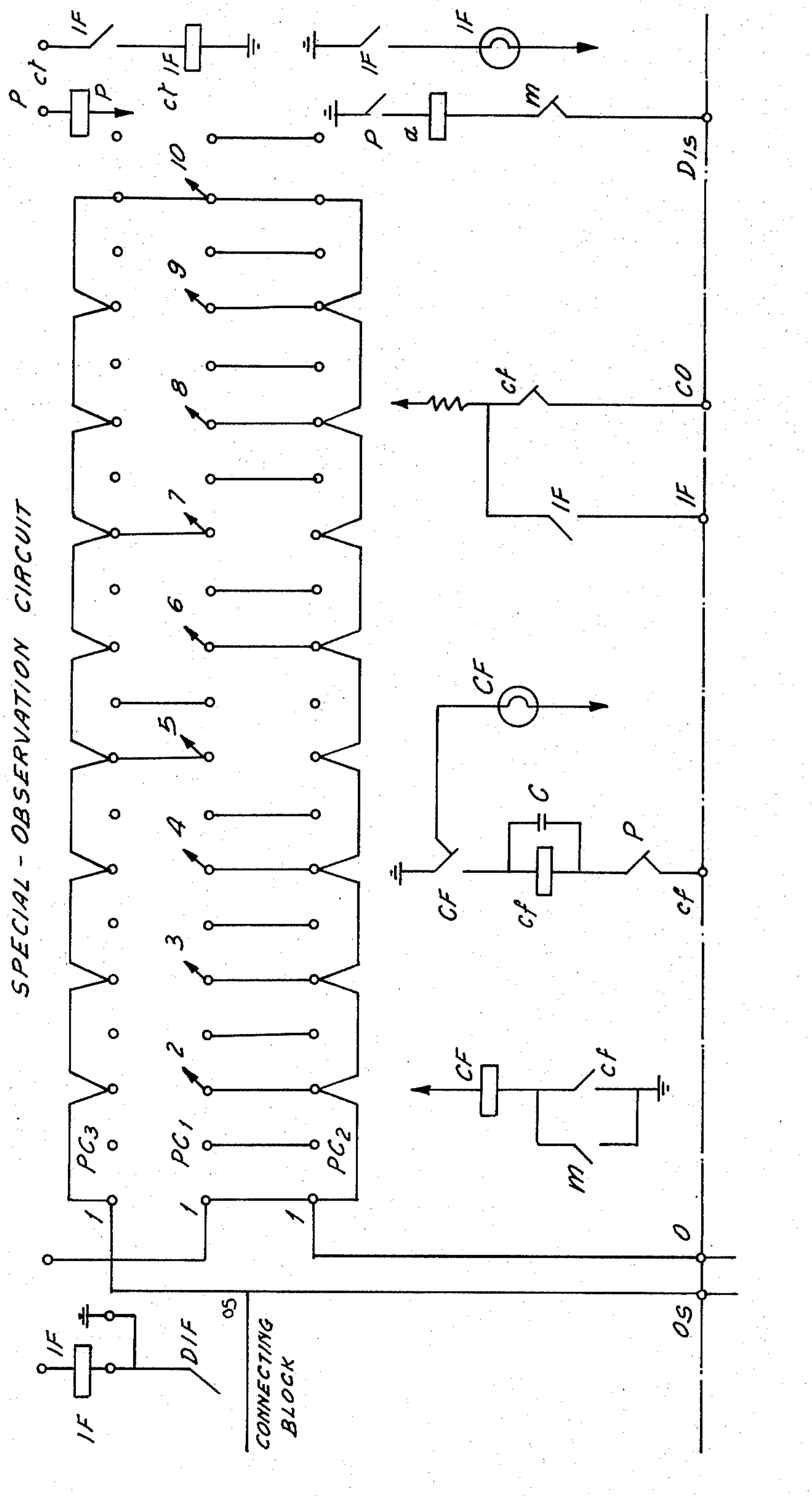
FIG. 4: Circuit diagram for special observations, automatic control of operation and for recording false pulses.
Figure 5:
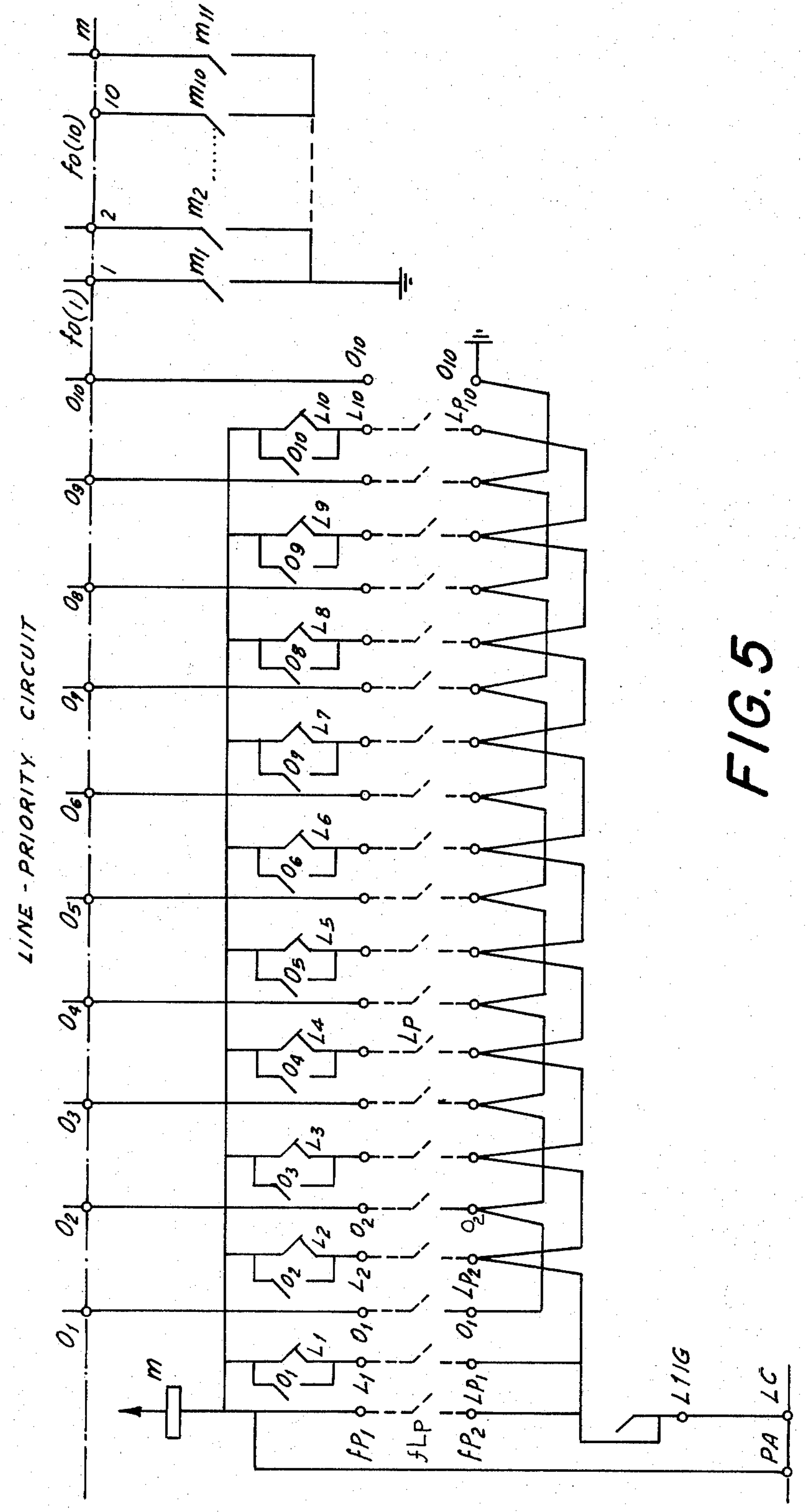
FIG. 5: Circuit diagram for automatic priority and connection, in common for all lines.

The secondary circuits $C_{CC}$ 1–10 each includes a circuit which for its part comprises the common selection, connection, special observations and priority circuits arranged as in FIG. 3, receiving from $C_L$ at the supervisory relay *p* the signal that a line is calling, performs a discrimination of the observation (whether a simple or a special one), connects the automatic recordal circuitry, records the false impulses and signals circuit $C_g$ that a line is at call (FIG. 4), which by receiving a signal at the relay *s* indicates that the robot $R_g$ is released, and the group selection is done, achieves the selection of a line which it connects with the robot $R_g$ (FIG. 5) which receives the connection signal at the relay *m* to indicate the engagement of the robot $R_g$ and that the chosen line is granted with priority.

Figure 6:
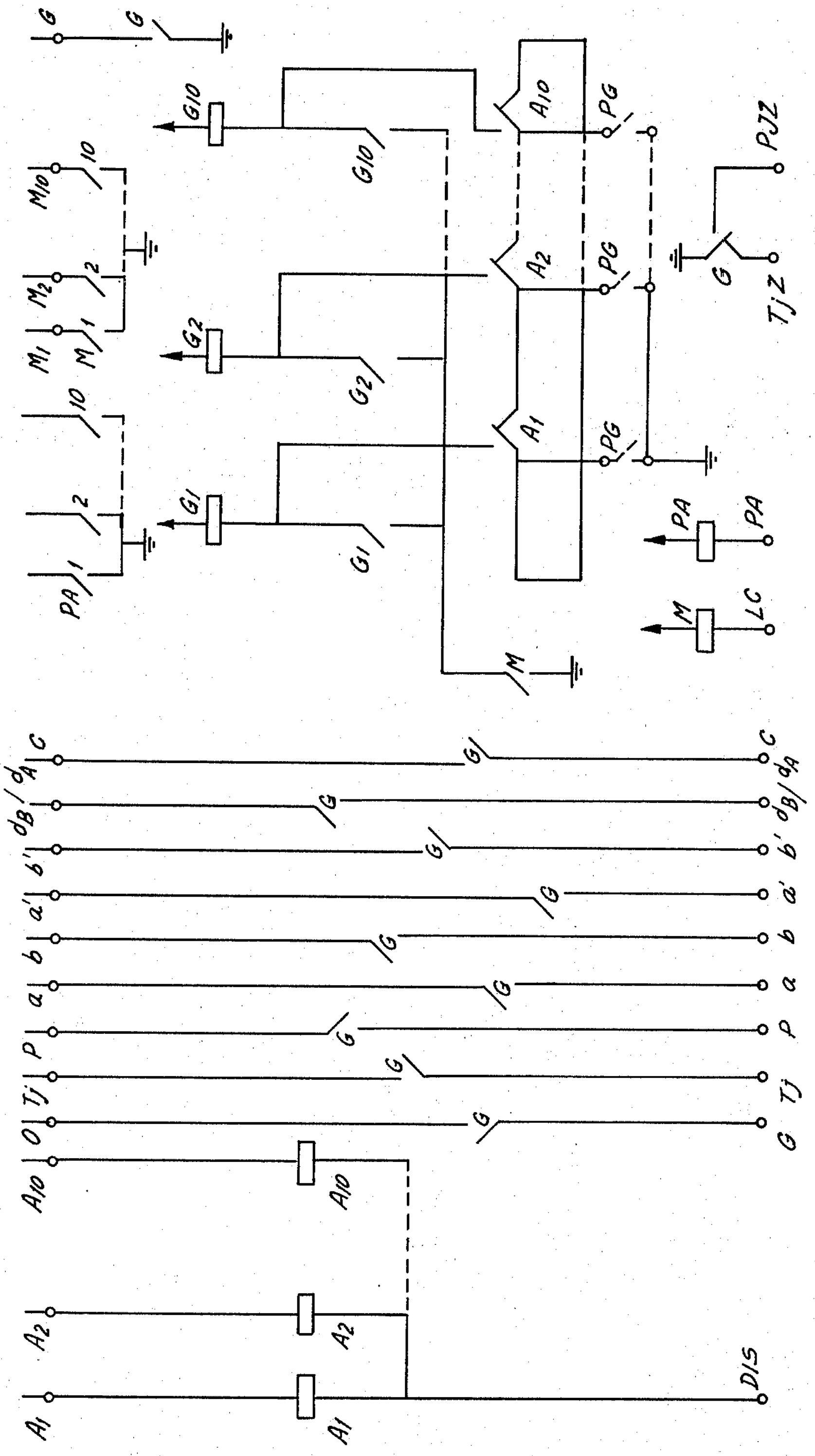
FIG. 6: Circuit diagram for group selection, priority and connection.

The group connection, circuit $C_g$ arranged as shown in FIG. 6, receiving from the relays A the group or groups of lines at call, selects a single group, transmits to the robot $R_g$ the group's calling code and orders line selection and connection of the robot to the circuits in $C_{CC}$ and $C_L$.

Figure 1:
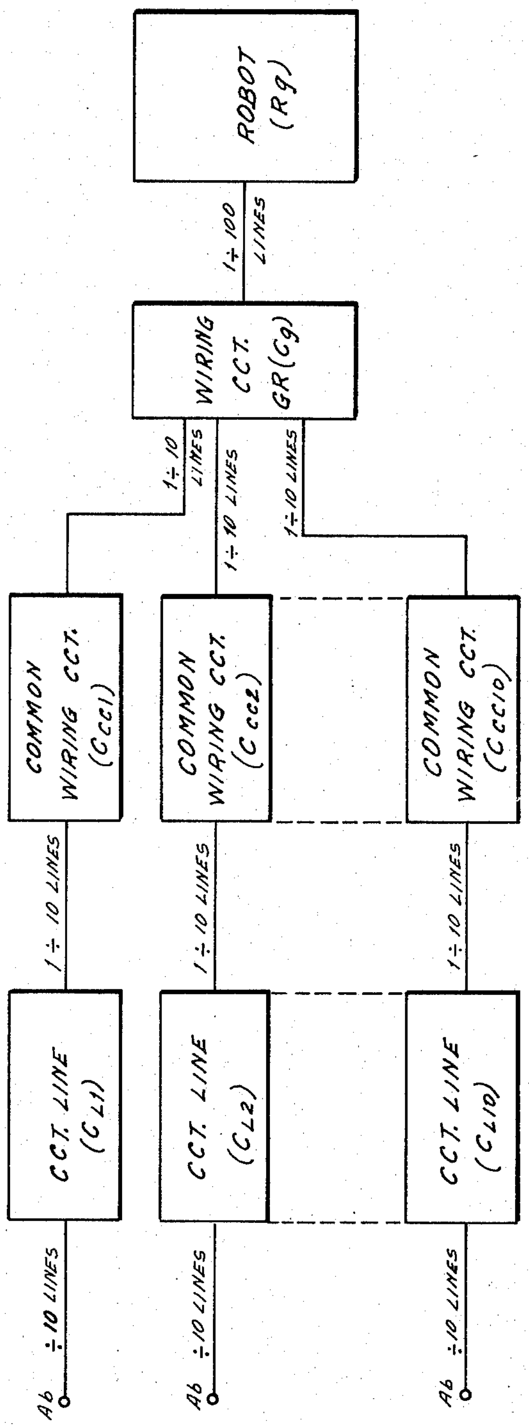
FIG. 1: is a block diagram of the appliance according to invention.
Figure 1A:
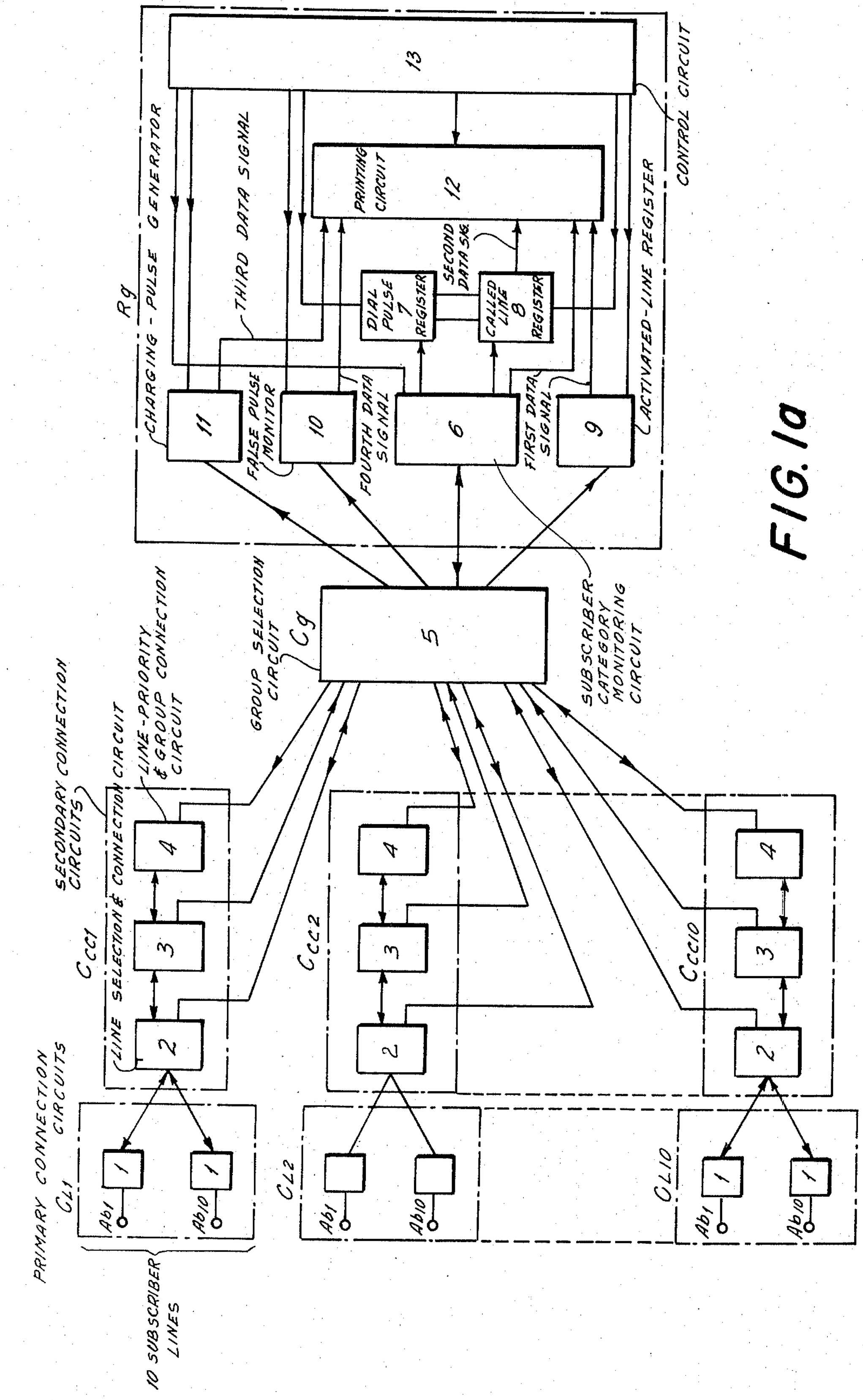
FIG. 1*a;* is a block diagram, showing in greater detail the systems of FIG. 1 with its component parts.

The same automatic device is seen in greater detail in FIG. 1*a*, wherein:

Block $C_L$ comprises: 10 circuits for line signaling, recording of charging impulses not recorded on the paper sheet and receiving false impulses, the circuits being represented at 1, with the possibility of connecting up to 10 blocks of 10 lines each, totaling 100 lines.

Block $C_{CC}$ comprises: a line selection and connection circuit 2, a circuit for special observations, recording of the false impulses and automatic control of the operation 3, a circuit for line priority and group connection, 4, the number of blocks $C_{CC}$ being equal to the number of blocks $C_L$.

Block $C_g$ comprises: The circuit 5 for group selection, priority and connection, to this block being connected 10 blocks $C_{CC}$ on one side, and on the other side the robot $R_g$. For its part the robot consists of a circuit 6 for the supervision, identification of the subscriber's category and special observations, a circuit 7 for counting cialine cipher pulses, registering the ciphers and storing the call address a circuit 8 for the control of the recording of the dialed call number a circuit 9 for recording the line calling number and of the group number, a circuit 10 for receiving and signaling false pulses, a circuit 11 for receiving charging pulses, a printing circuit, marked 12 and a circuit 13 for controlling the automaton.

The appliance according to this invention works in principle as follows. The line engaging signal 1 is transmitted by way of a circuit 2 to the group circuit 5 which identifies the group to which the calling line belongs, and monitors the circuit 2 to select this line and to connect it to the group connection circuit 5. After reception of the confirmation in the group connection circuit 5 that the line has been selected and connected, a signal identifying the subscriber's category is transmitted to the robot $R_g$, i.e.: to the supervision and subscriber's category identification circuit 6.

After the identification of the category, the signal for the engaging the line according to the identified category is sent back to the exchange by way of the group connection circuit 5 and the line connection circuit 2. At the confirmation, from the exchange, that the engaging is accomplished, the tone asking for dialing of the number is sent into the calling line. The inpulses from the dial are received in the circuit 7, controlled by cipher register 8 and transmitted thereto for printing to the circuit 12 which operation is achieved in the following way:

at the engagement of the circuit 6, the beginning of the connection is marked;

when the called line answers, the time is marked at which the talk begins;

when it finishes, its end is marked.

SIGNALLING THE LINE AND RECORDING CONVERSATIONS NOT PRINTED ON THE PAPER SHEET (FIG. 2). The system of FIG. 12 comprises: a relay L which operates when the receiver is taken up, and engages the common connection circuit, two relays $d_A$ and $d_B$, each with a diode in series which receive the positive and the negative charging pulses, and by their operating contacts direct these impulses to two counters C.t.A for the secondary subscriber and C.t.B. for the chief subscriber, as well as a relay C which controls the connection time of the line. When the call appears on the line, while the robot is engaged, a positive or a negative impulse is transmitted on the wire *d* which causes the relay $d_A$ or the relay $d_B$ to act, by means of the operating contacts $d_A$ or $d_B$, a negative potential is sent through the operating contact *fo* and the rest contact $\alpha$ to the recording counter C.t.A. In a similar way is recorded the call for the chief subscriber, but over the operating contact $d_B$ the operating contact fo, the resting contact $d_A$, the resting contact O, the recording-charging counter C.t.B. If positive or negative false impulses occur, either relay $d_A$ or relay $d_B$ operates and only the relay $D_A$ is effective to transmit only a negative impulse over the group and line connection common circuit to the robot, which records the pulse and all data concerning the line and time (month, day, hour, minute, second) and call number of the line, the number of impulses of the line. When the robot is engaged, then the false impulses are received in a common counter for 10 lines, a warning is issued, the line is held in the state in which the false impulse appeared, and upon the arrival of the mechanic or releasing of the robot, the line is identified and all data about time and false impulses are recorded. In the said conditions the robot remains free.

LINE SELECTION AND CONNECTION (FIG. 3). The diagram of FIG. 3 comprises a number of relays O equal to the number of lines of a line group which can be at the most 10 and which are marked with indexes from 1 to 10, and relays *fo*, one for each line. After receiving the disengagement potential from the robot, operates the relay *a* in the common connection circuit (FIG, 4) which by means of the operating contact connects a ground by way of priority connection (FIG. 5) wire 01–10 and by the operating contact 2 operates the relay O of priorty line, or, if this one is not in call, another line by exclusion. Through a commuting contact the relay O signals to the robot by the wire O for identification, which is done by the robot over the wire T*j*, due to the commutation of the ground for signaling. At the subscriber's answer, that the identification of the line is correct, a ground is applied by the wire *fo* and the operating contact L, and the relay *fo* acts, and so the line *a-b* is connected to the robot. The chain of contacts L.1-10 and 0.1-10 ensure the selection "one from ten".

Figure 14:
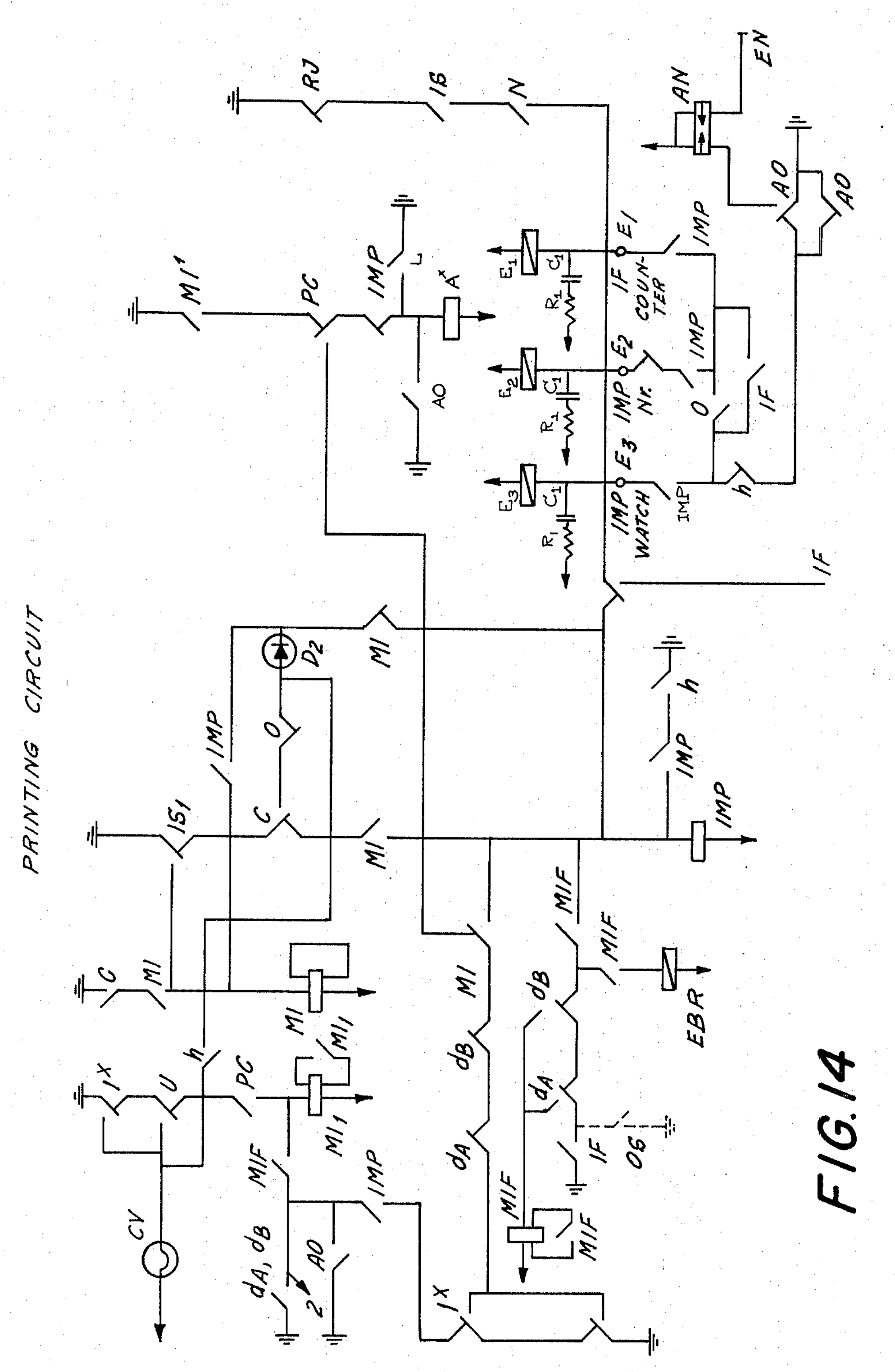
FIG. 14: Diagram of the printing circuit.

SPECIAL OBSERVATIONS, AUTOMATIC CONTROL OF THE WORKING AND RECORDING OF FALSE IMPULSES OF ALL LINES. (FIG. 14). The circuit comprises a strip, known per se, but whose connections are such, that the outgoing wires O coming from the commutation contacts O (FIG. 3) of the relay O are connected either with the wire O or with the wire OS so that a number of lines engage the robot without signaling special observations, and others signal special observations to a relay IF common for all 10 lines of a group $C_L$ and which acts on the wire IF for false impulses. The circuit also includes a relay CF which verifies on one hand that there is no blocking of the observation appliance and, on the other hand, the energizing of the system, a relay *cf* which verifies the enabling of the robot, a relay *p* which verifies the normal connection time of the robot, and a counter C.t.I.F which records the false pulses in all of the 10 lines.

Special observations: The grounding of the wire O is transferred in the strip OS to the wire OS and causes the relay OS in the robot to act. By way of the operating and the resting contacts of the relay OS and by way of the buttons and the connections made on request, connections are automatically done, either in view of adaption to another type of exchange, or for tape recording, or other services.

False impulses. From the circuit for signaling and recording of telephone talks not recorded on the paper sheet and of false impulses (FIG. 2) a negative pulse is sent to the wire IF, which causes the relay IF to act; by way of the operating contact of this relay, the counter C.t.I.F. of the signaling circuit is operated and stays so either until the arrival of the mechanic following a warning, or by the respect ive subscriber lifting the receiver; therefore the line is not blocked for conversation, but a signal is stored for recording and printing.

Automatic control of Operation. When the subscriber lifts the receiver the relay L operates the relay P. The relay P cuts off the circuit for holding the relay C*f* which remains attracted by the discharge of the capacitor C (delayed-release relay). The time constant is chosen such that if the engaging and connecting operation is normal, the relay P does not release itself, ensuring the relatching of the relay. C*f*, otherwise the relay C*f* opens, and by the rest contact C*f* a negative impulse is sent over the wire C*f* to the robot which operates the relay CO, a warning is issued with the indication BLOCKED IN THE OBSERVATION APPLIANCE. All lines pass automaticly into individual supervision, till the problem is remedied. If the energy supply of the system fails, the relay CF is released and in this situation the lines are automatically disconnected from the observation and a warning issues, with the notice NO SUPPLY.

AUTOMATIC LINE PRIORITY. The circuit of 16.5 comprises a strip known per se, but on which hand switches and a relay *m* for line maintaining and connection are mounted. The priority can be introduced on any line by shutting the switch Lp and is related to two situations.

priority when the subscriber picks the receiver up on several lines simultaneously, disconnection of any line from observation when the priority line goes into call, and connection of this line by priorty.

Priority at simultaneous "receiver lifts": When the signaling relay L (FIG. 2) is engaged the commutation contacts L 1/10 (FIG. 3) are operated and likewise the rest contacts L 1/10 (FIG. 5) are opened, such that the operating circuit of the relay O is ensured only for the priority line. The relay O is connected to ground by the operating contact L*p*, the priority line, the wire O the operating contact L (FIG. 3), the operating contact *a*, and the winding of the relay O. One signal relay O thus can be activated and a single line is connected to the robot.

Disconnecting from observation: Holding of the relay *m* is ensured by the rest contact L 1/10 of the signaling relay, the line L, and the contact L*p* on the priority line. When the priority line's subscriber lifts the receiver, the relay L acts and opens the resting contact L.1.I.G (FIG. 5), so that the relay *m* is released and the observation appliance is disconnected after printing indicia representing termination of observation. A new engagement but on the priority line, now occurs.

Line connection. When the robot is engaged, a ground is applied to the wire LC and the relay *m* acts through the operating contacts 1/10 and to connect the relays *fo* from each call line to the wire fo, while the operating contact *m* 11 and the wire *m* ensure the holding of the relay O of the line under observation. At the line under observation are operated both relays *fo* (FIG. 2) and O (FIG. 3). By the operating contacts of the relays *fo* and O the observation line is connected to the robot.

GROUP SELECTION AND PRIORITY (FIG. 6). The circuit of FIG. 6 comprises 10 relays G marked 1/G.10 which, when operated, determine the group from which the line will be chosen for observation which of 10 relays A identified marked A 1/A 10 which act. A relay P.A. acts in case of an absolute priority.

Group selection. When one or several call relays *a* of the common connection circuit (FIG. 4) acts, one or several relays A are grounded by the wires A.1/A.10. By the action of the relays A.1/A.10 the computation contacts A1–A10 are connected to the relays G.1/G.10. Depending on the position of the switch P.G. the circuit is ensured only for the relay G for which priority is provided, and the connection is made. When the relay G operates, ground potential is sent by the commutation contact G to the robot by the wire PJ*z* for starting the group recorder PJZ which will stop at the respective group due to the cutting off of the ground from the wire TJZ by the commutation to the wire PJZ. On the other hand, by the operation contact G and the wire G, ground potential is applied to the line circuit of the respective group and the call relay *a* is operated, so that selecting of the line from ten is as discussed above. By the operating contacts of the relay G, the wires *a*, *b*, *a'*, *b'*, P, O, T*jd*B, *d*A and C are connected to the robot.

Group priority. Since one single contact PC is ensured when several relays A are operated, the ground potential over the operating contact is cut off by the commutation chain A.1/A.10 and distributed to a single relay G. The group priority must be the same as the line priority. For the absolute priority a ground potential is applied to the wire P.A and operates the relay PA by the operating contacts PA 1/10, all relays *m* (FIG. 5) act and therefore, as has been shown at the line selection, a single relay O acts, and the operated relay is not released, having been held by the operating contacts of the relay *m* and the operating contacts *m.1/m.10* (*FIG. 5*).

ROBOT SUPERVISION, SPECIAL OBSERVATIONS AND IDENTIFICATION OF THE CATEGORY OF THE SUBSCRIBER. The robot or automaton comprises a relay marked OS acting on the wire OS (special observations), a supervision relay IS acting on the wires *a*, *b* from the calling telephone, an engaging relay L acting when line selection is finished, a relay A identifying the coupled subscriber A in the Rotary exchange system (7A and 7D) and a relay *tp* identifying the coupled subscriber A in the Pentaconta exchange system.

Special observations. When a special observation (special type of exchange, tape recording, etc.) for some line is required, the ground potential of the commutation contact of the relay O (FIG. 2) is transferred by the special observations strip (FIG. 4) to the wire OS so that the relay OS in the robot acts. By the commutation contacts the differential relay *tp* is put in series into the line *a-b* so that for the coupled subscriber A out-of-balance sets in and the relay *tp* operates again by way of the operating contact A which directs the charging impulses for the subscriber A. If the special observation is not required, the relay OS does not act, the windings of the relay *tp* are short-circuited. In this case, the line *a-b* extends to the relay L and the circuit has the role of blocking the diode in the talking set and the relay IS cannot act. The relay O being operated, a ground potential is sent by way of the operating contact of the relay O, the rest contact IS and the rest contact C to the windings of the relay A. The relay A acts, and, by the commutation contacts, it reverses the direction of the line and the line-current direction, so that the diode inside the talking set is unblocked and the relay IS acts. By way of other operating contacts of the relay A the category of the coupled subscriber, and the charging impulses are recorded.

COUNTING THE CIPHER IMPULSES, STORING CIPHERS AND STORING THE DIRECTION OF CALLS. This circuit comprises six counting relays I*a*/I*f*, an impulse control relay receiving the impulses from the relay I.S. (FIG. 7), a relay PC to store the first cipher operating upon receiving the series of calls for the first cipher, a relay controling the release of the counting relays I*a*/L*f*, after transmission of the first impulse train, a storage relay I for long-distance calls acting upon introduction of the long-distance call code letters, a storage relay SS for calls to special services, acting upon calls to special services a storage relay SS5 acting only on chargeable special services, and a relay for the end of dialing responding to operation of the above ennumerated relays.

Pulse counting. The relay IS in the supervision circuit (FIG. 7) tips in the cadence of the pulses transmitted by the subscriber from the the dial. At the first release of the pulse the state of the counting relays does not change, but as soon the relays operate, the relay I*a* (self latching) acts again and holds itself by it own contact. At a new releasing of the relay IS (FIG. 7) the relay IB also acts, and at a new attraction of the relay IS the relay I*a* releases itself so that only the relay Ib remains energized thereby signaling that two impulses have been transmitted. The pulse train is transmitted in this manner causing the chain operation of the relays I*s* and I*f*. Controlling the train of impulses is accomplished by the relay CI by its commutation. At the end of the pulse train, the relay CI is released and the ground potential for holding the counting relays is cut off, so that the relays I*a*/I*f* are released. The control of the release is ensured by the operating contacts I*a*/I*f* and the rest contacts CI, so that the relay C1 is maintained between two points at ground potential as long as at least one relay I*a*/I*f* is operated. After the release of all relays I*a*/I*f* the relay C1 acts in series with the relay PC indicating that the first cipher has been introduced and the next operation follows.

Counting of ciphers: If a chargeable special service indication is not given, counting of the ciphers is switched by the operation of the relay C1 to the relays I*a*/I*f*, the counting of the pulses being no longer of interest. Therefore the relay CI acts with each impulse train only once, irrespective of the number of pulses transferred by commutation of the relay C1. Counting of the ciphers is done in the same manner as the counting of the pulses. When the number of ciphers has been introduced accurately (which is verified by the storage relay) the relay S*f* acts, to indicate the end of the dialing sequence.

Call direction storage: Long distance calls and receiving long-distance code signs. The relay I operates, by the operating contact IP*a*, rest contact I*b*, rest contact SS, the windings of the relay I. In this case the relay S*f* operates after the introduced number is that of the long distance call.

Special service call: When receiving the cipher for special services, the relay SS operates via, the operating contact I*f*, I*d*, I*b* the winding of the relay SS; in this case, counting of the ciphers does not begin and the second cipher is awaited for an analysis. If the call is towards a chargeable special service the relay SS5 operates via the operating contact C1, rest contact I, operating contact SS and, operating contact I1, the windings of the relay SS5. After the operation of the relay SS5 begins, counting of the ciphers and the operating of the relay S*f* is done after the transmission of the number of ciphers indicating the chargeable special service. Simultaneously with the operation of the relay S*f*, counting is stopped and the circuit for talk recording and control of charges is prepared.

Figure 7:
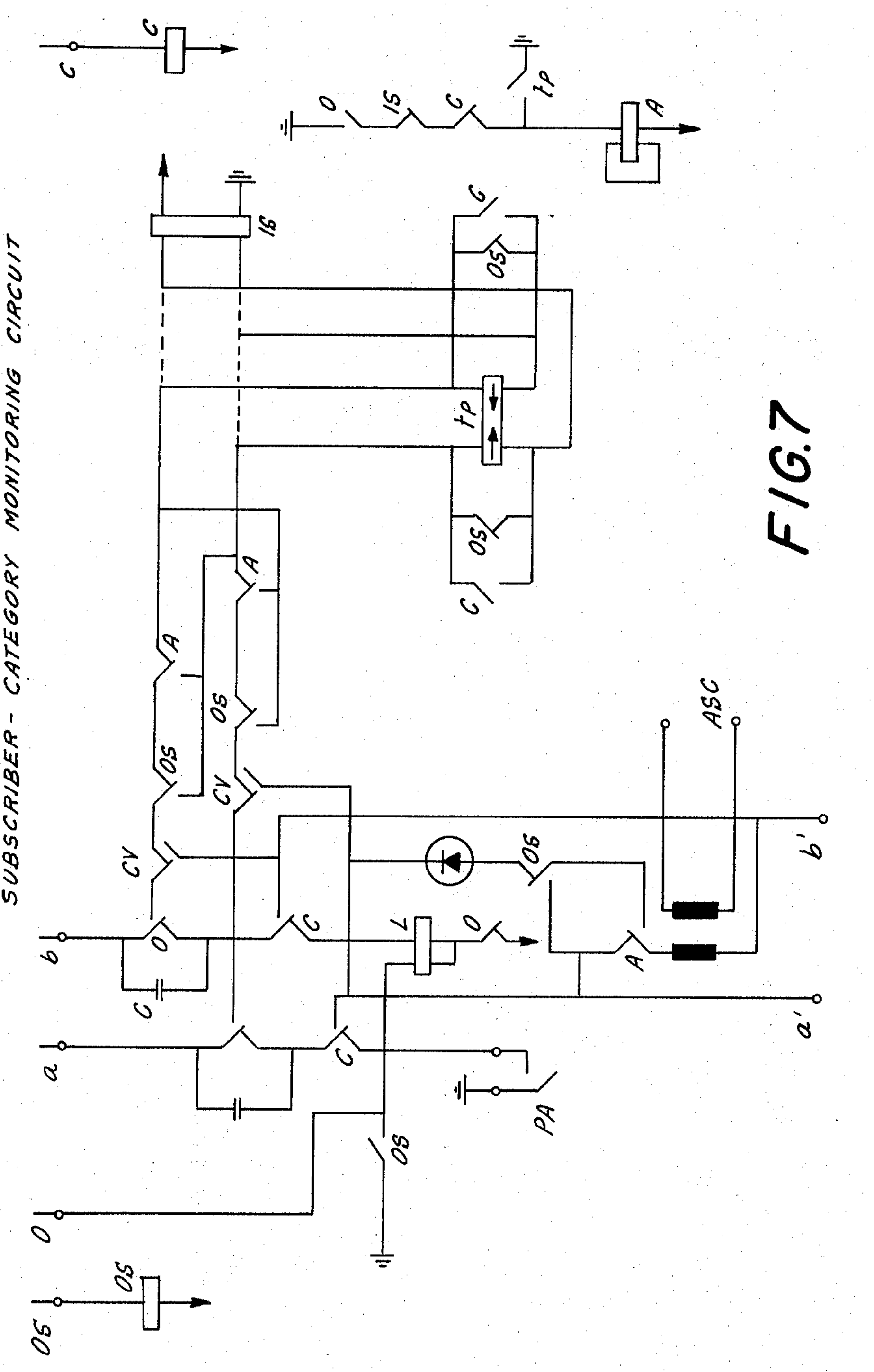
FIG. 7: Circuit diagram for supervision, special observations and identification of the category of the subscriber.
Figure 8:
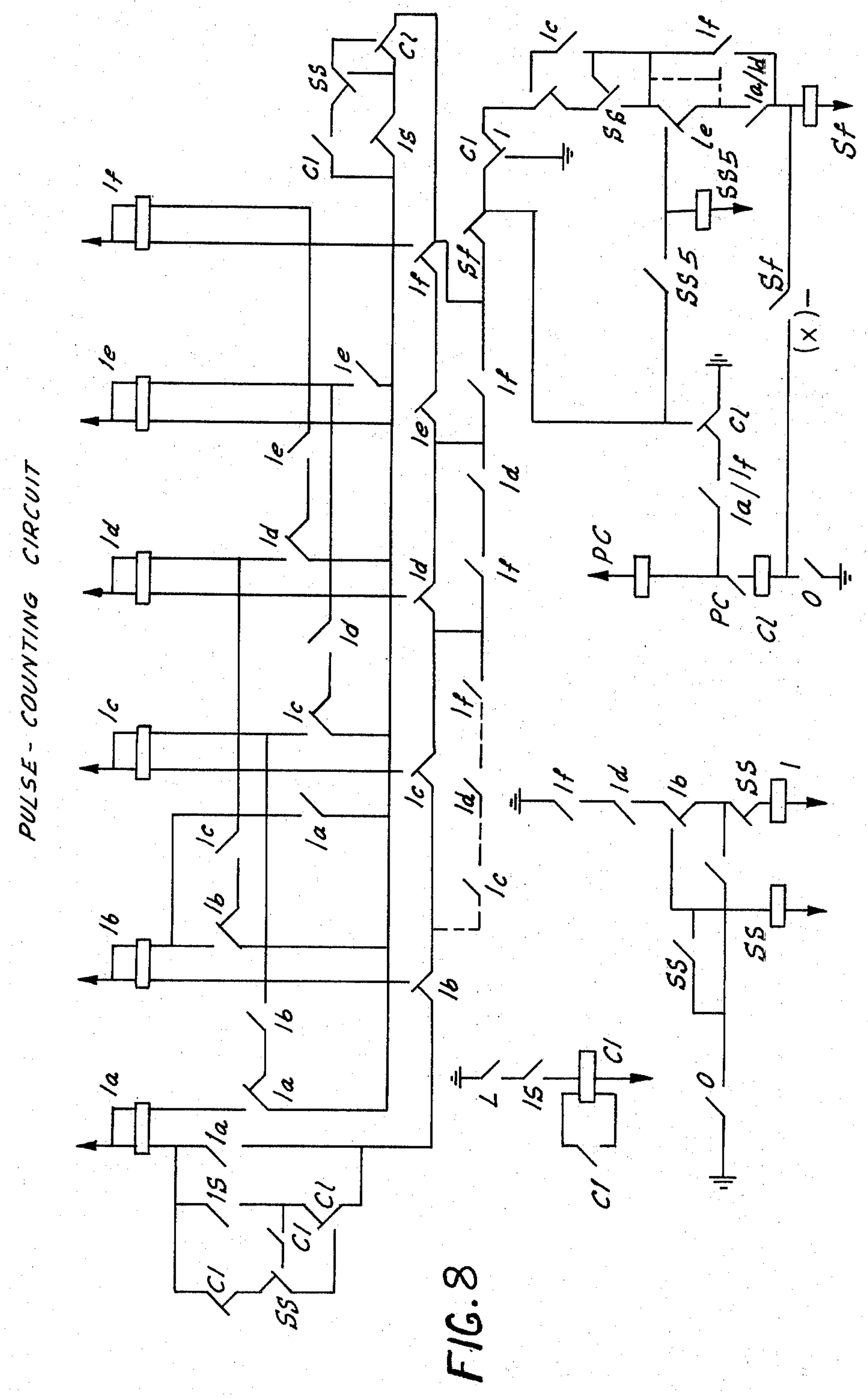
FIG. 8: Circuit diagram for pulse counting.
Figure 9:
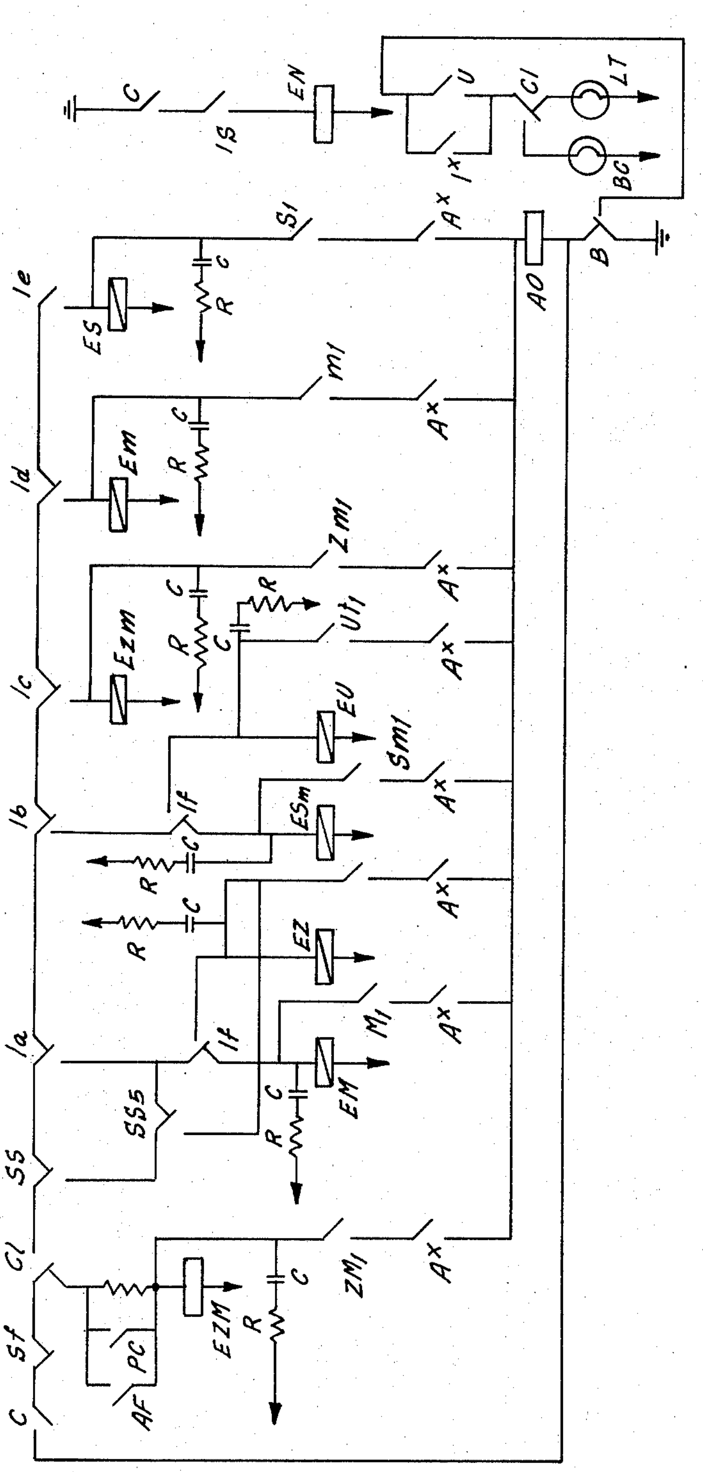
FIG. 9: Circuit diagram for reception of dialed call number.

RECORDING OF CIPHERS (FIG. 9). This circuit comprises a number of electro-magnets of small power and overall dimensions EZM, EU, their number equalling the number of ciphers making up a call number, and a power electro-magnet EN receiving the dial impulses by means of the relay IS (FIG. 7). Upon the operation of the holding relay C, the ground potential applied through rest contact B, operating contact, C, rest contacts S*f* and C1, starts the electro-magnet of the first cipher EZD. This attracts its armature and the rod attached to it couples the pawl of the type bearer, recording the first cipher. When the relay IS (FIG. 7) tips, impulses are sent from the subscriber's dial to the electro-magnet EN by way of the operating contact C and IS whose number equals the dialed cipher such that the respective type-bearer is stepped by the number of pulses, which is stored for printing. In the interval between the introduction of the first and that of the second cipher, the relay C1 acts, and by way of the commutation contact C1 and commutation contact I*a* the circuit for the electro-magnet EZM is interrupted and the circuit for the electromagnet EM is closed. The rod of the electromagnet EZM is uncoupled, the pawl from the electromagnet EN returns and the pawl of the rod for the second cipher is rendered effective. In the same manner as for recording the first cipher, the electromagnet EN tips and starts the type -bearer for the second cipher, storing it for printing. The cipher registration is as follows: First cipher, EZM operated, Commutation C1, rest, operating commutation C1 rest commutation I*a*. Second cipher, EM operated. Third cipher: operating commutation C1, rest, commutation I*a*, operating commutation I*b*, ES*m*, operated. And so forth, up to the last introduced cipher. Operating commutation C1, operating commutation I*a*, operating commutation I*b*, commutation If, EU operated. At the end of the dialing, the relay S*f* (FIG. 8) acts and further recording is prevented.

Figure 10:
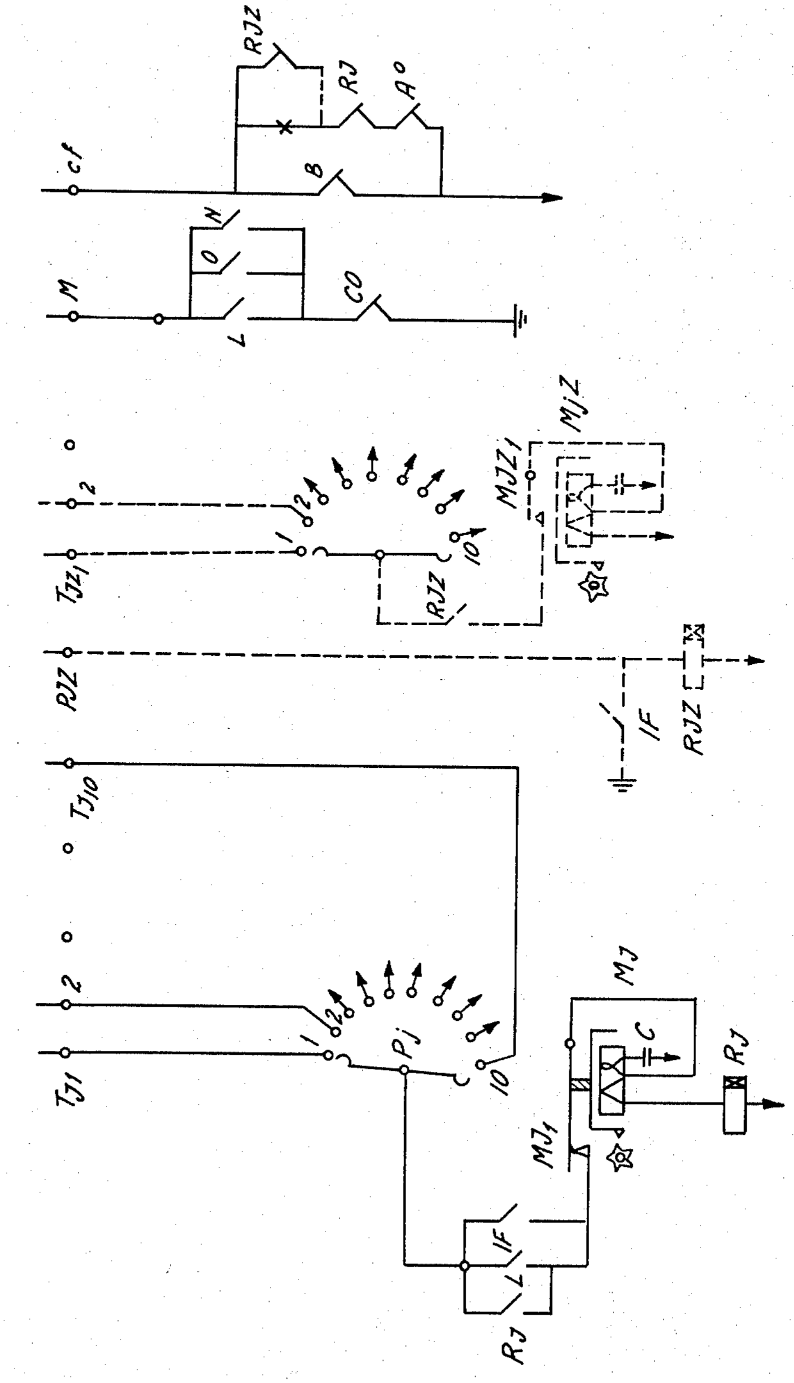
FIG. 10: Circuit diagram for recording the line and group number of the chosen subscriber.

RECORDING GROUP AND LINE NUMBER (FIG. 10): the diagram related to this example comprises two markers of special construction, one group marker recording the group number, and one line marker recording the line number M*j*.

Recording the group number MJZ: After the group selection is done, the relay G (FIG. 6) is operated and by two-way contact applies ground potential to wire RJZ and operates the relay RJZ. By the operating contact RJZ, the electro-magnet MJZ operates via the wire TJZ with ground potential from the rest contact, the commutation of the relay G (FIG. 6) is done. Simultaneously with the rotating of the brush around the contacts-bow, the type-bearer also rotates. The type bearer carries the number of each group; the brush PJZ stops at the position at which the commutation of the relay G (FIG. 6) is acting, that is to say at the group chosen by the selecting operation. The group number is stored for printing, to the end of the connection.

Recording of the line number. When the line selection is complete, the relay O (FIG. 3) is operated and by its commutation applies ground potential to the wire O which attracts the relay L, in the robot (FIG. 7). By way of the operating contact of the relay L is closed the circuit of the electromagnet MJ is closed, this electromagnet being built and working in the same way as MJZ, so that the brush PJ stops on the wire TJ at which the commutation (FIG. 3) is operating. The line number is retained for printing until the end of the connection.

Figure 11:
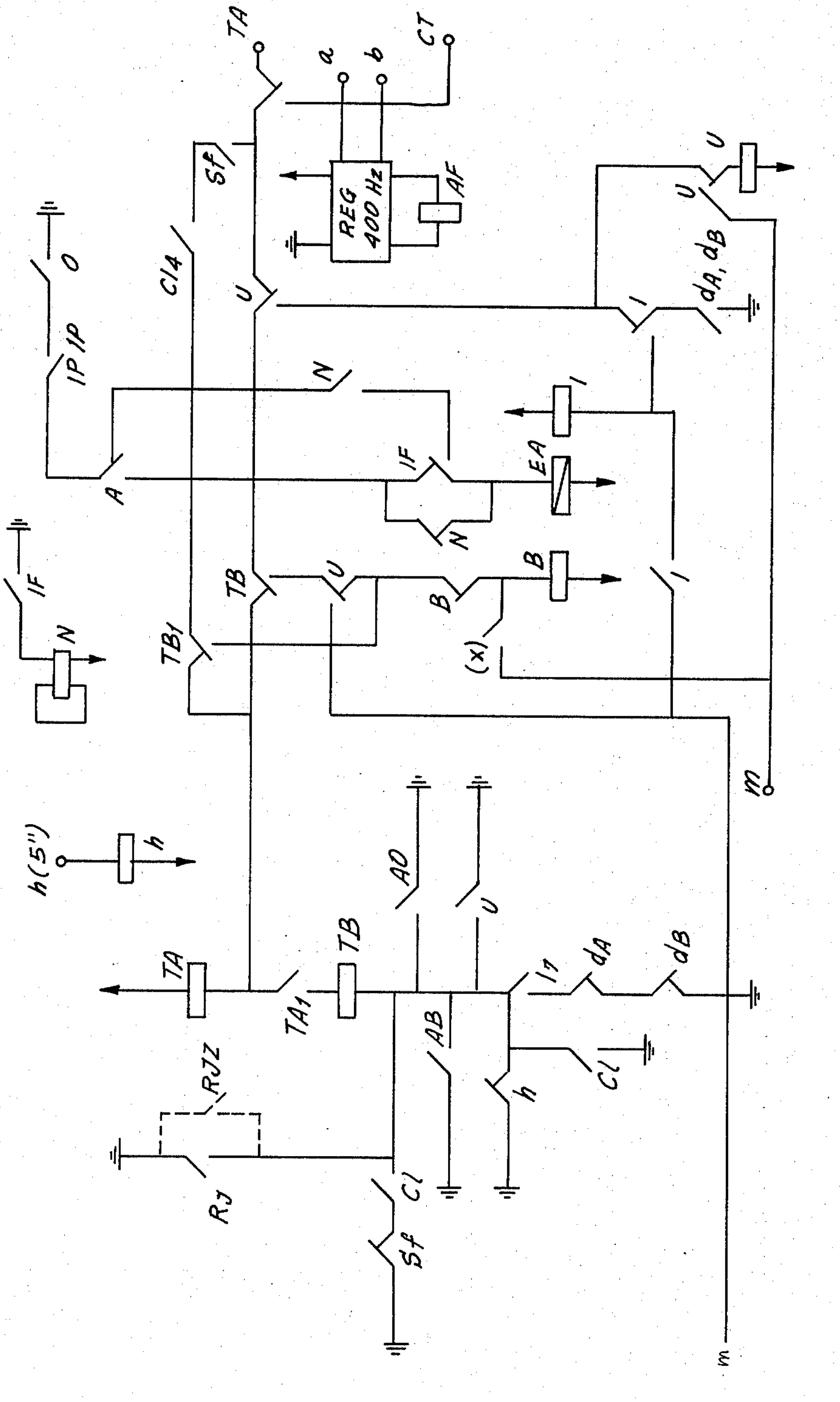
FIG. 11: Circuit diagram for the control of the performance of the robot.

CONTROL OF OPERATION, OF TARIFF, OR FALSE CALLS AND OF CORRECT CHARGING AT WRONG IDENTIFICATION (FIG. 11). This circuit related to this example comprises: one relay TA acting at each control pulse coming over the wire PA, a relay PB acting only when the control is required, a relay B acting when the working conditions are unsuitable, a relay I acting at the beginning of a long-distance call marking the tariff-rate control time, a relay U acting at the beginning of a local call marking the control for the false pulses, a relay N acting at the first false pulse and an electromagnet holding the coupled subscriber A.

Control of operation:

a. Control of the printing time. On the wire TA pulses are transmitted every 30 seconds, so that at every pulse the relay TA acts, and in the interval between the impulses the relay TA lies in series with the relay TB by the rest contact of the relay *h*. If the time pulse does not arrive, the relay *h* stays free; after 30 seconds a new impulse arrives by the wire TA and if the relay TB is not released by the attraction of the relay *h*, the contact operates TB the relay B, which by its operating contacts starts an acoustic and optical warning with the indication PRINTING TIME.

b. Control of operation. If an anomaly occurs in the working of the observation system, the relays A, RJZ, CI or C1 stay operated more than 30 seconds and in this case the relay B is operated in the same way as in the paragraph *a*. A warning is issued with the indication APPLIANCE BLOCKED, if the relays A*o*, C1, R*j* are operated, or EXCHANGE BLOCKED if relays C1 and CI stay operated.

c. Control of false call. In this case the relay AF remains attracted more than 30 seconds and operates in the same way the relay B which gives a warning with the indication FALSE CALL d. Tariff lacking. For tariff control, upon operation of the relay I, the wire TA is switched over to CT. On this wire are transmitted pulses where intervals re greater than the greatest interval of the first charging zone. When the tariff is wrong, neither of the relays *d*A or *d*B works inside the considered interval, such that the following pulse operates the relay B and a warning is issued, saying: NO TARIFF.

e. False impulses. For a local call the relay U is operated, with the first tariff charging pulse, which by operating contact closes the control circuit for the relays TA and TB; if a second call arrives, one relay, *d*A or *d*B acts and, by way of the operating contact *d*A or *d*b, operating contact U, and operating contact TB, the relay IF (FIG. 12) is operated and a warning is issued, saying: FALSE IMPULSES.

f. Control of accurate charging for coupled subscribers. If by accident or on purpose a negative impulse is sent when a positive one only would have been correct the subscriber category which is being printed is that for which the impulse appears, and the indication issued is: SUBSCRIBER B TALKS DEBITING SUBSCRIBER A, or vice-versa; likewise, if a positive impulse appears instead of a negative one, by the operating contact O, the operating contact 1P1P, rest contact A, operating contact N, operating contact IF electro-magnet NA, the indication is: SUBSCRIBER A TALKS DEBITING SUBSCRIBER B, or vice-versa.

Figure 12:
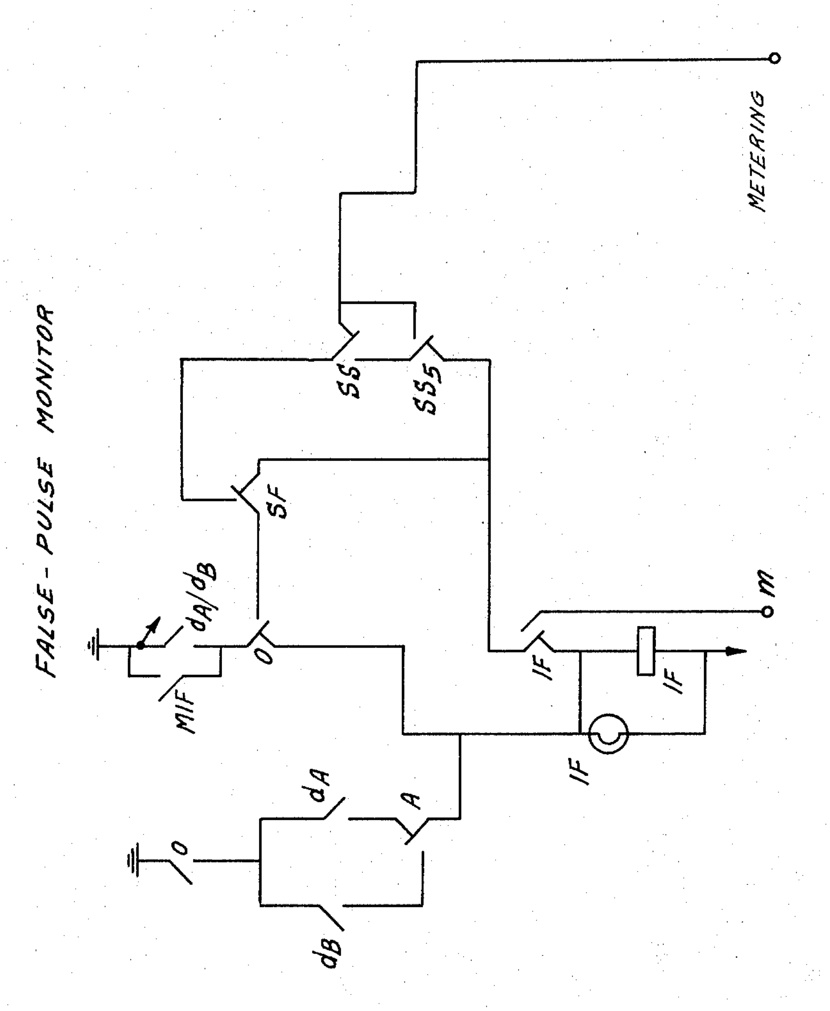
FIG. 12: Circuit diagram for the reception and signaling of false impulses.
Figure 13:
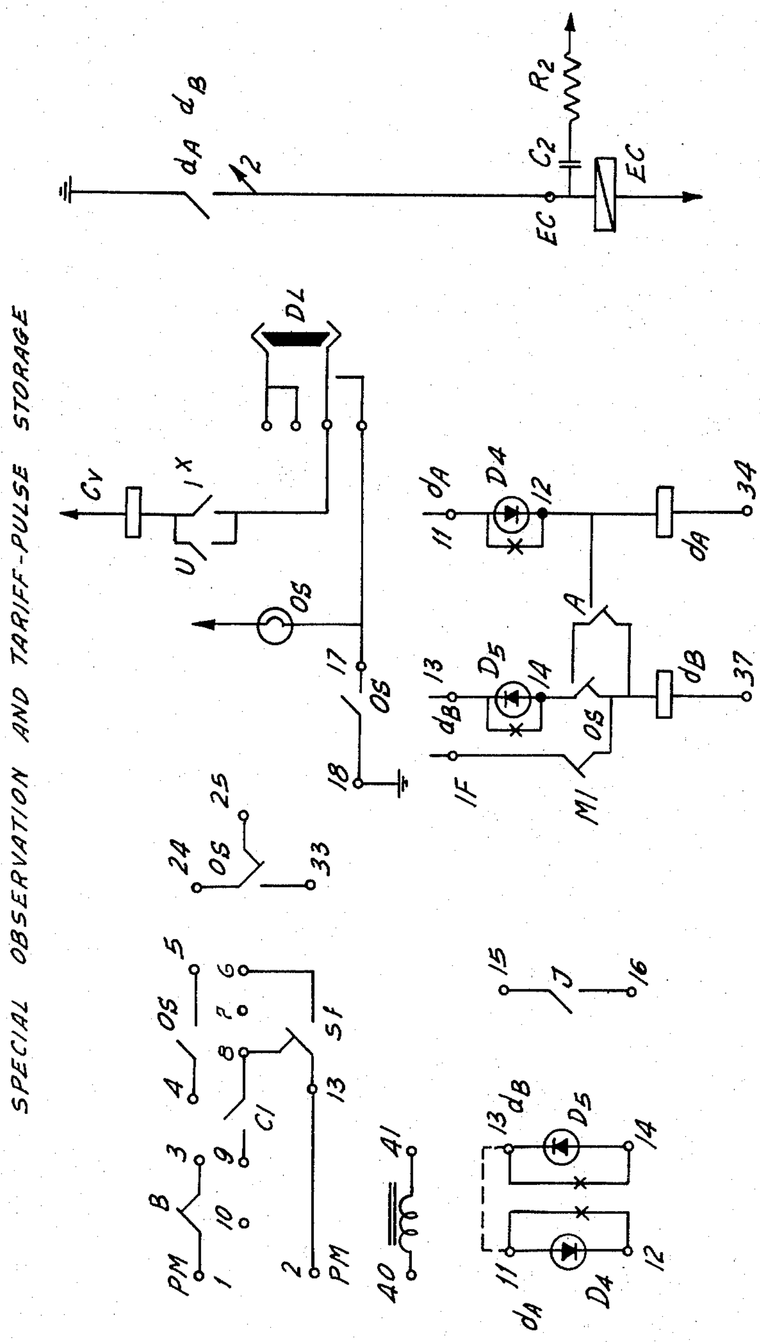
FIG. 13: Circuit diagram for, special observations and reception of tariff-rate charging impulses.

RECEIVING AND SIGNALLING FALSE IMPULSES (FIG. 12). This circuit comprises a relay IF, which receives all false impulses in the following manner: the robot is free and a false pulse appears on one of the observation lines. In this case the relay *d*B acts on the wire IF (FIG. 14), the rest contact MI and by the operating contact *d*B (FIG. 12) and the rest contact O triggering the false pulses receiving relay IF, which causes the following operations:

a. it closes one circuit each for the markers MJZ, MJ (FIG. 10) which in starting, stop on the line on which the false impulse appears after the test principle of the line as described above.

b. it closes a circuit for the relay MIF (FIG. 13) which prepares the printing on the paper sheet of all observation dates in another color than the usual one, c. it closes the circuit for an acoustic and optical warning saying: FALSE IMPULSE. The robot is not freed the false impulse appears on the line which is in observation at the robot. In the same way which the relay IF which operates the relay MIF (FIG. 13) and a printing is made in red ink of all necessary data concerning the nature of the false pulse and the phase in which it occurred: when receiver is replaced, during dialing, at calls to the unchargeable service or when the line was occupied.

SPECIAL OBSERVATIONS AND RECEPTION OF CHARGING IMPULSES. This circuit comprises a strip, known per se, but whose terminals are connected to the contacts of the relay OS for special observations, the relay B for disconnection in case of accidents, the relay SF for disconnection at the end of dialing and the relay for connection only when pulses are transmitted. By combinations of links, various special observations can be obtained, as: information for the restriction of the line, tape recording, adaptation to any kind of exchange, and so on; a relay Cv combines with the relay OS (FIG. 7) to adapt the line for long distance; if the relay *d*A or *d*B is active the first one for reception of negative charging impulses on the wire A meant for the coupled subscriber, the second one for the reception of negative charging impulses on wire B, then an electromagnet EC will act, which with every charge pulse pushes forward a type accumulating the charge data for printing on the paper sheet, since its circuit is closed each time the relay *d*A or *d*B closes the operating contact *d*A *d*B, respectively.

PRINTING TELEPHONE OBSERVATION DATA. The printing circuit 12 comprises slow release relays MF, MI, and MIF of which the first enables the printing circuit at the beginning and at the end of the connection, the relay MFI enables the circuit when the called subscriber answers, and the third relay MIF enables the printing circuit for false impulses. A relay IMP controls the printing via four electro-magnets which operate the rubber pads for printing the data on the paper sheet. Electromagnet E.1 is provided for printing the charging cipher, electromagnet E.2 for printing the dialed call number, electromagnet E.3 for printing the time (month, day, hour, minute, second) and electromagnet EBR for changing the ink band for printing in another color, two relays A and AN controling the resetting to zero of the number type, bearers after each printing.

Printing at the beginning of the connection. After the identification of the line is done, the relay R*j* (FIG. 10) is released, and by the rest contact R*j*, operating contact IS, operating contact N, rest contact CI, the relay IMP acts; by the operating contacts IMP ground potential is applied by rest contact A*o*, *h* to the electromagnets E1, E2, E3 which operate by hammering upon the respective types for the printing of the respective datas.

Printing at the answer of the called subscriber: In this case the relay MI1 is operated first at the beginning of the dialing by rest contact I, U, operating contact IC. When the called subscriber has answered, the relay U or I acts, depending on the nature of the call (local or long-distance) and by operating contact U or I, rest contacts *d*A or *d*B operating contact M11, the relay IMP acts which closes the circuit for the printing electromagnets E1, E2, E3.

Printing at the end of the connection: since the relay MI acts from the beginning of the connection, when the receiver is replaced, the relays IS and C are released and by their resting contacts ground potential is applied, by operating contact MI to energize relay IMP and electromagnet E1, E2, E3.

Printing with another colour: In this case the relay MIF acts either from the relay IF (false pulses, FIG. 12); or from the relay OS for special observations, by operating contact IF or OS and MIF operates the electromagnet EBR which changes the ink band with one of another colour and operates at the same time also the relay IMP for printing.

Printing at incoming call: When a call comes in, the relay C acts and sends by its operating contact ground potential over rest contact IM to the winding of the electromagnetic IMP, which upon its signal closes the circuits of the electromagnetic E1 for printing the beginning of the connection. At the end of the call the relay C is released and relay MF releasing slowly maintains its operating contact long enough for the relay IMP to act and close the circuit for the printing electromagnet E1.

The telephone service observation appliance according to this invention offers the following advantages:

1. The observation data are gathered on common paper sheets, no special carsor photosensitive paper are necessary; at the same time the possibility is given to pursue easily the observations on a line and the results can be shown the subscriber when any doubt occurs.

2. All data is recorded, including the day and the month, so that the intervention of the operator is necessary only to replace the paper sheet at the end of the observation period. Recording of all datas being automatic, there is the certainty that no error or omission has occurred.

3. The appliance can work on any line (whether coupled or single) and in any coupling system.

4. There may be placed under observation within a given period lines from different types of exchanges with different coupling systems and markings, the percentage of one type of exchange against another being as desired, adaptation to the robot being automatic.

5. All lines under observation are supervised even when the robot is occupied and if two or more simultaneous calls occur, the observation condition is nevertheless fulfilled.

6. Regardless of the way the subscriber operates the dial, all ciphers are accuarately recorded, this also when the subscriber turns the dial by force back into normal position and two ciphers 1 are produced up.

7. The false pulses are received as often as they occur, regardless of the state of the robot — whether free or engaged.

8. The false impulses are printed in another color, so that, their recording once done, they cannot any more be blotted out, thus the mechanic of the exchange is obliged to acknowledge the fault. Simultaneously with false impulses also the calling number of the line is printed and a warning is thereby given of a defect in this system.

9. Any line can be provided with primary, secondary or absolute automatic priority.

10. The data which is obtained reflects not only the control of toll charges but also those regarding the quality of the working of the exchanges, as the robot gets the information straight from the subscriber, transmits them to the exchange, receives them, and after operating on them in the exchange, transmits them to the subscriber, after first verifying whether the answer is correct. If a fault is stated, an acoustic warning is issued, and a written indication tells the cause of the fault.

11. No working anomaly, either in the exchange or in the appliance has any repercussion upon the line, thus the subscriber need not suffer, as the working control intervenes, and in each case, the case of the defect is analyzed, and, be it that the lines in observation pass from the robot to individual recording, be it that a "turning over" of the lines with their disconnection from the observation is done, in all cases a warning is issued, and a written indication appears, telling the cause of the deficiency.

12. All operations on a line under observation are recorded an alytically and inclusively, such as repeatedly picking up and replacing the receiver, the duration of a false call is measured, an acoustic warning with an optical indication FALSE CALL SUBSCRIBER A or B being given, wrong charging of coupled subscribers, either by accident or by intention, the state of a line at any time is visually indicated, "dialing", "call or occupied", "local talk", "long-distance talk", "international talk" or "special service", "tariff lacking", "false impulses", "exchange blocked", "observation appliance blocked," etc.

13. The capacity of the telephone service observation appliance according to this invention's specification amounts to 100 lines, but it can be dimensioned accordingly to needs for any capacity, being available from one line to 100 lines, as "1 L", "2 L". . . . "10 L", . . . . ."100 L" types.

I claim:

1. A telephone-system monitoring and recordal apparatus for a multiplicity of subscriber lines connectable selectively through at least one exchange with called-subscriber lines upon the dialing of the called-subscriber line by a calling-subscriber line, said apparatus comprising:

A. a plurality of primary connection circuits connected to respective groups of subscriber lines;

B. respective secondary connection circuits, each connected to one of said primary connection circuits and including:

$B_1$. a line selection and connection responsive to a first instruction signal for selective connection to one of the subscriber lines of an associated primary connection circuit and for transmitting a first information signal relating to the identity of a selected subscriber line of the associated group, $B_2$. a special-observation circuit responsive to the activation of one of the subscriber lines of the group of the associated primary connection circuit for transmitting a second information signal relating to a prior instruction for observation of the activated subscriber line, and $B_3$. a line-priority circuit responsive to the activation of one of the subscriber lines of the group of the associated primary connection circuit and energizable by a second instruction signal for facilitating connection of the activated subscriber line in accordance with its priority among the lines of the respective group;

C. a group selection circuit connected to all of said secondary connection circuits and responsive to said information signals for transmitting said instruction signals to said line selection and connection circuits and to said line-priority circuits respectively;

D. an automaton connected to said group selection circuit and including:

$D_1$. a subscriber-category monitoring circuit connected to said group selection circuit and responsive to a signal therefrom triggered by said information signals for identifying the category of an activated subscriber line, for producing a first data signal representing the identified category, and for transmitting a signal to said group selection circuit for initiating the transmission of said instruction signals thereby, $D_2$. a dialing-pulse register receiving dialing pulses from an activated subscriber line connected to said automaton in response to said initiating signal produced by said subscriber-monitoring circuit, upon the dialing by the activated subscriber line of the called-subscriber line, $D_3$. a called-line register connected to said dialing-pulse register for producing a second data signal representing ciphers of the called-subscriber line, $D_4$. a charge-pulse generator responsive to said group selection circuit for monitoring the duration of a call subsequent to connection of an activated subscriber line to a called-subscriber line through said exchange and generating a third data signal representing a toll charge, and $D_5$. a printing circuit including:

$D_{5a}$. an electromagnetically activatable time-printing device having alpha numeric characters representing the instantaneous data, hour, minute and second, $D_{5b}$. an electromagnetically activatable charge-printing device operated by said third data signal and bearing ciphers representing a toll charge, $D_{5c}$. an electromagnetically activatable called-number printing device bearing ciphers representing the called-subscriber line and operated by said second data signal, and $D_{5d}$. a further printing device connected to said subscriber-category monitoring circuit and responsive to said first data signal for registering indicia representing the group of subscriber lines from which an activated subscriber line is selected and the identifying number of the activated subscriber line; and $D_6$. control means for operating at least some of said printing devices at least upon connection of the activated subscriber line to a called-subscriber line and again upon disconnection of said activated subscriber line from said called-subscriber line to print the information registered by said devices on a sheet of paper.

2. The apparatus defined in claim 1 wherein said automaton further comprises:

$D_7$. A false-pulse monitor connected to said group selection circuit and responsive to the generation of false pulses in circuits associated with said line for producing a fourth data signal; and wherein said printing circuit further comprises:

$D_{5e}$. Electromagnetic means responsive to said fourth data signal for altering the color of the printing applied by said devices to said paper sheet upon detection of false pulses by said false-pulse monitor.

3. The apparatus defined in claim 2 wherein each of said groups comprises 10 subscriber lines and 10 such primary and secondary circuits are connected to said group selection circuit.

4. The apparatus defined in claim 3 wherein said group selection circuit (C) includes:

$C_1$. Means for monitoring said automaton to determine the availability thereof to accept information relating to an observed subscriber line;

$C_2$. means for signaling the generation of a false pulse and for retaining the line upon which the false pulse appears in readiness for connection to said automaton in the event said automaton is occupied and for transmitting the last-mentioned signal to said automaton and the false-pulse monitor ($D_6$) thereof in the event said automaton is available; and $C_3$. means for releasing the retention of said line upon which said false pulse appears, upon activation of the latter line to initiate a telephone call.

5. The apparatus defined in claim 4, further comprising printing means responsive to said false-pulse monitor recording the nature thereof upon said sheet upon occurrence of the false pulse in the event said automaton is unoccupied or upon release of said automaton from other observation service.

6. The apparatus defined in claim 5, further comprising priority-switch means energizable to enable immediate connection of a selected line to said automaton.

* * * * *